United States Patent
Kishi et al.

(10) Patent No.: US 12,111,186 B2
(45) Date of Patent: Oct. 8, 2024

(54) MAGNETIC SENSOR UNIT FOR ACCURATELY DETECTING CHANGE OF MAGNETIC FIELD

(71) Applicant: TOYO DENSO KABUSHIKI KAISHA, Tokyo (JP)

(72) Inventors: Shoji Kishi, Tsurugashima (JP); Toshiya Yoshida, Tsurugashima (JP)

(73) Assignee: TOYO DENSO KABUSHIKI KAISHA, Tokyo (JP)

( * ) Notice: Subject to any disclaimer, the term of this patent is extended or adjusted under 35 U.S.C. 154(b) by 151 days.

(21) Appl. No.: 17/961,607

(22) Filed: Oct. 7, 2022

(65) Prior Publication Data

US 2023/0132014 A1     Apr. 27, 2023

(30) Foreign Application Priority Data

Oct. 25, 2021   (JP) .................. 2021-173786

(51) Int. Cl.
    *G01D 5/14*     (2006.01)

(52) U.S. Cl.
    CPC ......... *G01D 5/145* (2013.01); *G01D 2205/40* (2021.05)

(58) Field of Classification Search
    CPC .... G01D 2205/40; G01D 5/145; B62K 23/04; B62K 11/14; F02D 11/02; F02D 11/10; G01P 7/00; G01P 3/44; G01P 15/0888; G01P 13/00; G01P 15/00; G01P 13/02; G01V 3/00; G01V 3/08; G01R 33/00; G01R 33/07; G01R 33/02; G01R 19/00; G01R 33/072; G01R 1/04; G01R 19/155; G01R 33/0047; G01R 33/0094; G01R 33/0005

See application file for complete search history.

(56) References Cited

U.S. PATENT DOCUMENTS

| 6,920,805 B2 * | 7/2005 | Samoto .................. B62K 23/04 74/551.9 |
| 7,078,893 B2 | 7/2006 | Nakano et al. |
| 8,464,691 B2 * | 6/2013 | Hiei ........................ F02D 11/02 74/551.9 |

(Continued)

FOREIGN PATENT DOCUMENTS

| JP | 2007-132819 A | 5/2007 |
| JP | 2007-187540 A | 7/2007 |

(Continued)

OTHER PUBLICATIONS

Official Communication issued in corresponding European Patent Application No. 22200305.5, mailed on Feb. 28, 2023.

*Primary Examiner* — Vinh P Nguyen
(74) *Attorney, Agent, or Firm* — Keating & Bennett, LLP

(57) ABSTRACT

A magnetic sensor unit capable of accurately detecting a change of a magnetic field by a magnetic sensor and accurately positioning each magnet with respect to a yoke includes a yoke fixed to a rotor relatively displaced with respect to a base plate, two magnets fixed to the yoke and disposed apart from each other in a relative displacement direction of the rotor, and a magnetic sensor fixed to the base plate and detecting a change of a magnetic field formed by the two magnets. The yoke has a convex portion protruding between the two magnets. The convex portion includes abutting portions on which the two magnets abut.

9 Claims, 8 Drawing Sheets

(56) References Cited

U.S. PATENT DOCUMENTS

| | | | | |
|---|---|---|---|---|
| 9,182,249 B2* | 11/2015 | Suzuki | ................. | G01D 5/145 |
| 10,539,430 B2* | 1/2020 | Honda | ................. | G01B 7/14 |
| 2007/0103149 A1 | 5/2007 | Horie et al. | | |
| 2014/0354268 A1 | 12/2014 | Kouno et al. | | |
| 2017/0122781 A1* | 5/2017 | Oyama | ................. | G01P 3/487 |
| 2017/0292856 A1 | 10/2017 | Takiguchi et al. | | |
| 2019/0011286 A1 | 1/2019 | Honda et al. | | |
| 2019/0072619 A1 | 3/2019 | Naka | | |

FOREIGN PATENT DOCUMENTS

| | | | |
|---|---|---|---|
| JP | 2007187540 | * | 7/2007 |
| JP | 2019190405 A | * | 10/2019 |

* cited by examiner

MAGNETIC SENSOR UNIT FOR ACCURATELY DETECTING CHANGE OF MAGNETIC FIELD

BACKGROUND OF THE INVENTION

Field of the Invention

The present invention relates to a magnetic sensor unit, and particularly to a magnetic sensor unit that accurately detects a change of a magnetic field.

Description of the Related Art

Conventionally, a magnetic sensor unit that detects a change of a magnetic field formed by a magnet with a magnetic sensor has been known (Japanese Laid-open Patent Publication (Kokai) No. 2007-132819). For example, the magnet is fixed to one member and the magnetic sensor is fixed to the other member, and the relative displacement of both members from each other is acquired from the result of detecting the change of the magnetic field when both members are relatively displaced from each other by the magnetic sensor. The range in which the displacement of the detection target can be detected depends on the range of the magnetic field formed by the magnet.

Japanese Laid-open Patent Publication (Kokai) No. 2007-132819 discloses a rotation angle detection unit including a cylindrical yoke, two magnets fixed to an inner peripheral portion of the yoke, and a magnetic sensor disposed at a rotation center of the yoke.

In a technique described in Japanese Laid-open Patent Publication (Kokai) No. 2007-132819, two magnets are disposed apart from each other in the circumferential direction of the yoke. Therefore, a space is formed between the magnets. In this space, the magnetic flux density is likely to decrease in accordance with the size of the space between the magnets, and is likely to be affected by the external magnetic field. Therefore, it is difficult for the magnetic sensor to accurately detect the change of the magnetic field. In addition, in the technique described in Japanese Laid-open Patent Publication (Kokai) No. 2007-132819, it is difficult to accurately position each magnet with respect to the yoke.

SUMMARY OF THE INVENTION

The present invention provides a magnetic sensor unit capable of accurately detecting a change of a magnetic field by a magnetic sensor and accurately positioning each magnet with respect to a yoke.

Accordingly, an aspect of the present invention provides a magnetic sensor unit comprising: a magnetic body fixed to a second member that is relatively displaced with respect to a first member; at least two magnets fixed to the magnetic body and disposed apart from each other in a relative displacement direction of the second member; and a magnetic sensor that is fixed to the first member and is configured to detect a change of a magnetic field formed by the at least two magnets, wherein the magnetic body has a convex portion protruding between the two magnets, and the convex portion has abutting portions on which the two magnets abut.

According to the present invention, a change of a magnetic field can be accurately detected by a magnetic sensor, and each magnet can be accurately positioned with respect to a yoke.

Further features of the present invention will become apparent from the following description of exemplary embodiments with reference to the attached drawings.

DESCRIPTION OF THE EMBODIMENTS

Hereinafter, embodiments of the present invention will be described in detail with reference to the drawings. Note that the configurations described in the following embodiments are merely examples, and the scope of the present invention is not limited by the configurations described in the embodiments.

Figure 1:
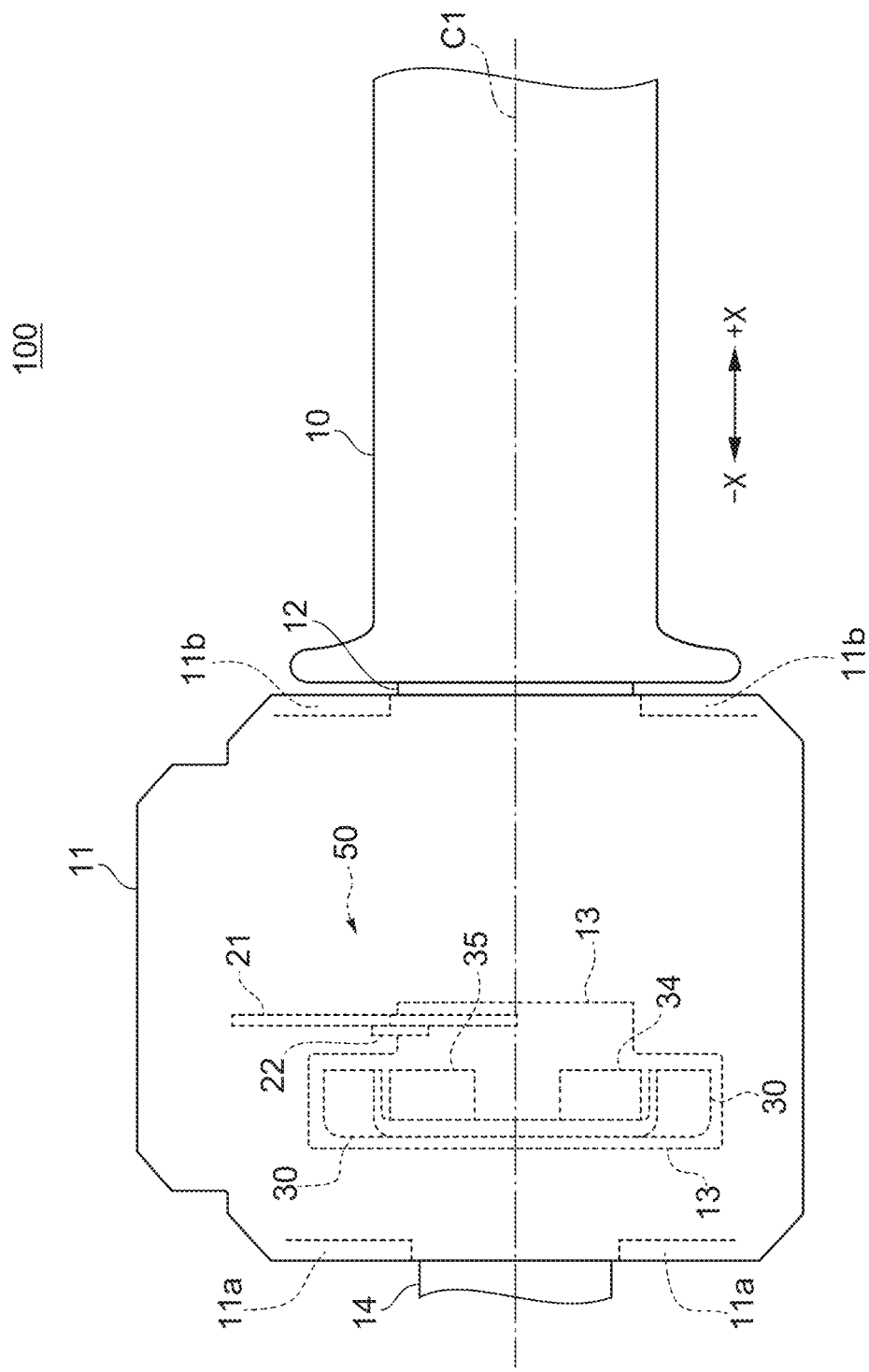
FIG. 1 is a schematic view of a throttle grip device to which a magnetic sensor unit is applied.

A throttle grip device 100 shown in FIG. 1 is attached to a portion extending rightward of a handlebar 14 of the motorcycle as an example. The vehicle body to which the throttle grip device 100 is applied is not limited to a motorcycle (a two-wheeled vehicle), and examples of such vehicle include various vehicle bodies, such as a snowmobile and a personal watercraft in addition to three-wheeled or four-wheeled buggies with a bar type handle. The throttle grip device 100 includes a grip portion 10 and a housing 11. In the direction (X direction) of the handlebar 14, the distal end side of the handlebar 14 is set to the +X side, and the vehicle body center side is set to the −X side. The grip portion 10 is disposed in a region including a distal end portion of the handlebar 14. The grip portion 10 is made of a rubber material or the like. The housing 11 is disposed adjacent to the −X side (vehicle body center side) with respect to the grip portion 10.

A throttle pipe 12 is supported by the handlebar 14. The throttle pipe 12 has a substantially cylindrical shape and is rotatable around a rotation center C1 of the handlebar 14 along the outer peripheral surface of the handlebar 14. It should be noted that the rotation center C1 is parallel to the X direction. In addition, the grip portion 10 is disposed on the outer periphery of the throttle pipe 12. The throttle pipe 12 rotates about the rotation center C1 of the handlebar 14 in accordance with the rotation operation of the grip portion 10 by the driver.

Figure 2:
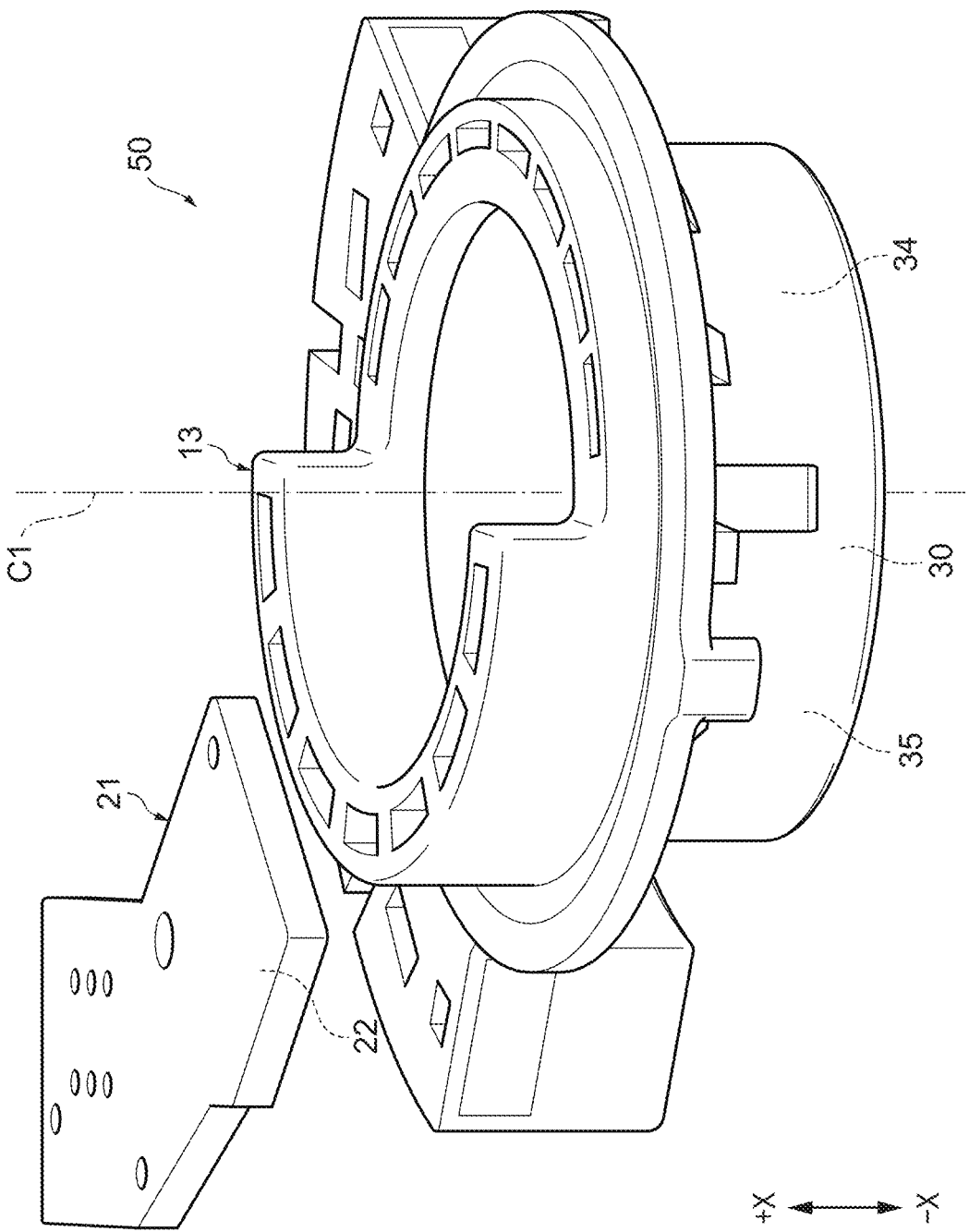
FIG. 2 is an external perspective view of a base plate and a rotor included in the throttle grip device.
Figure 3:
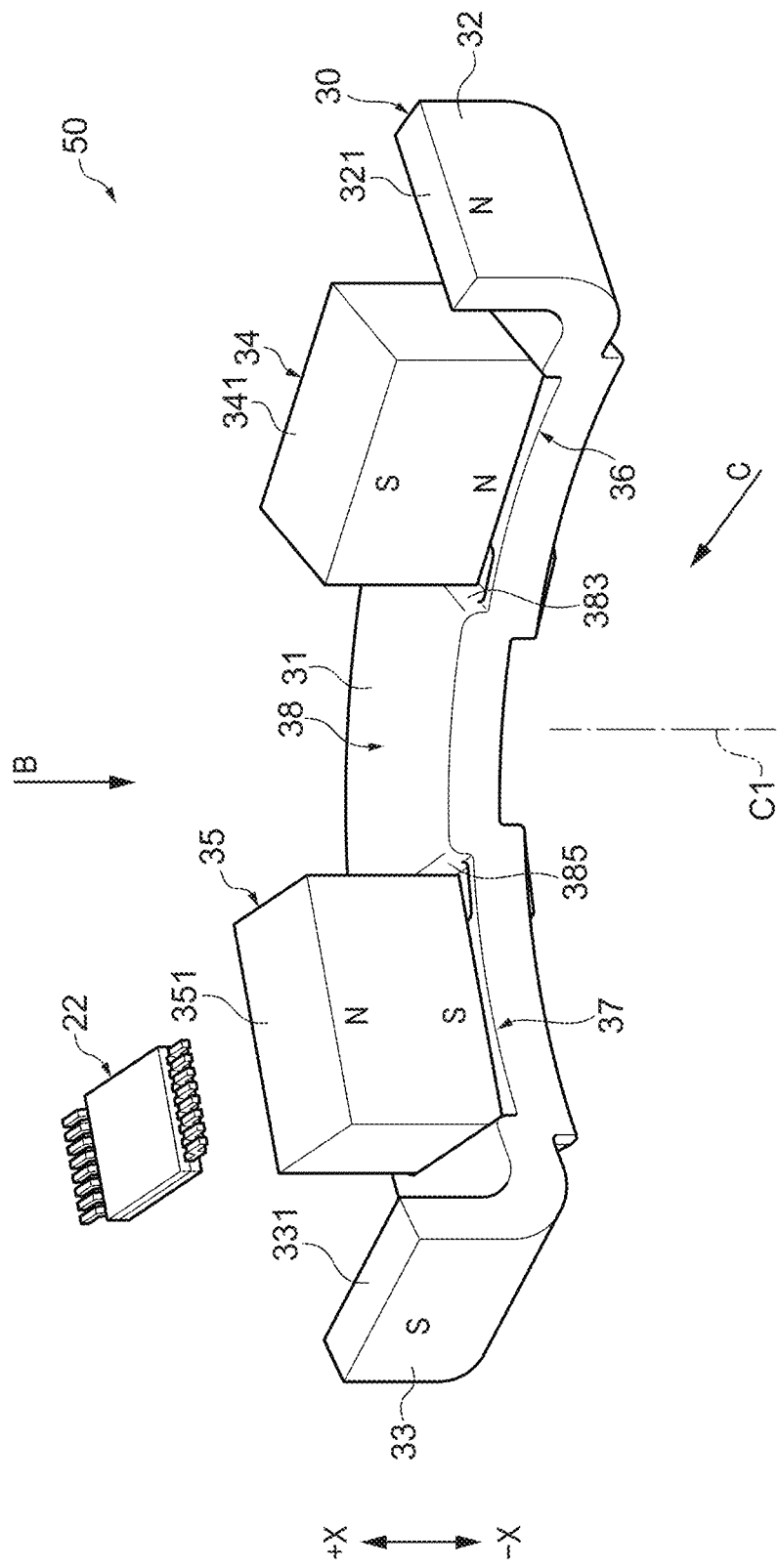
FIG. 3 is a perspective view of a main part of the magnetic sensor unit supported by the base plate and the rotor.

The housing 11 houses a base plate (a first member) 21, a rotor (a second member) 13 that is rotationally displaced relative to the base plate 21 about the rotation center C1, and a magnetic sensor unit 50 (see FIG. 2). As shown in FIG. 3, the magnetic sensor unit 50 includes a magnetic sensor 22, a magnet (a first magnet) 34, a magnet (a second magnet) 35, and a yoke (a magnetic body) 30. It should be noted that, although the magnetic sensor unit 50 includes two magnets (the magnet 34 and the magnet 35) in the present embodiment, the number of magnets is not limited to two, and may be, for example, three or more. In addition, the housing 11 has an outer wall, in which a wall on a side (−X side) close to the vehicle body of the two-wheeled vehicle is an outer wall 11a and in which a wall on a side (+X side) close to the grip portion 10 is an outer wall 11b. The yoke 30, the magnets 34 and 35, and the magnetic sensor 22 are positioned in this order from the closest side to the outer wall 11a, in the X direction. As a result, the yoke 30 can effectively reduce the influence of the external magnetic field on the magnetic sensor 22, which can contribute to the downsizing of the housing 11. It should be noted that, regarding the arrangement of the yoke 30, the magnets 34 and 35, and the magnetic sensor 22, as long as the yoke 30 is disposed between the magnetic sensor 22 and the outer wall 11a or 11b closer to the magnetic sensor 22, the disposition of the yoke 30, the magnets 34 and 35, and the magnetic sensor 22 is not limited to the disposition shown in FIG. 1.

The base plate 21 is fixed to the housing 11 via a fixing member (not shown). The magnetic sensor 22 is mounted (fixed) on the base plate 21. The rotor 13 to be detected for displacement is fixed to the throttle pipe 12. The yoke 30 is fixed to the rotor 13. The magnet 34 and the magnet 35 are fixed to the yoke 30. Therefore, when the grip portion 10 rotates, the rotor 13, the yoke 30, the magnet 34, and the magnet 35 rotate collectively in conjunction with the throttle pipe 12. The rotation angle of the throttle pipe 12 is detected by a magnetic sensor unit 50 as an accelerator position sensor (APS).

Figure 4:
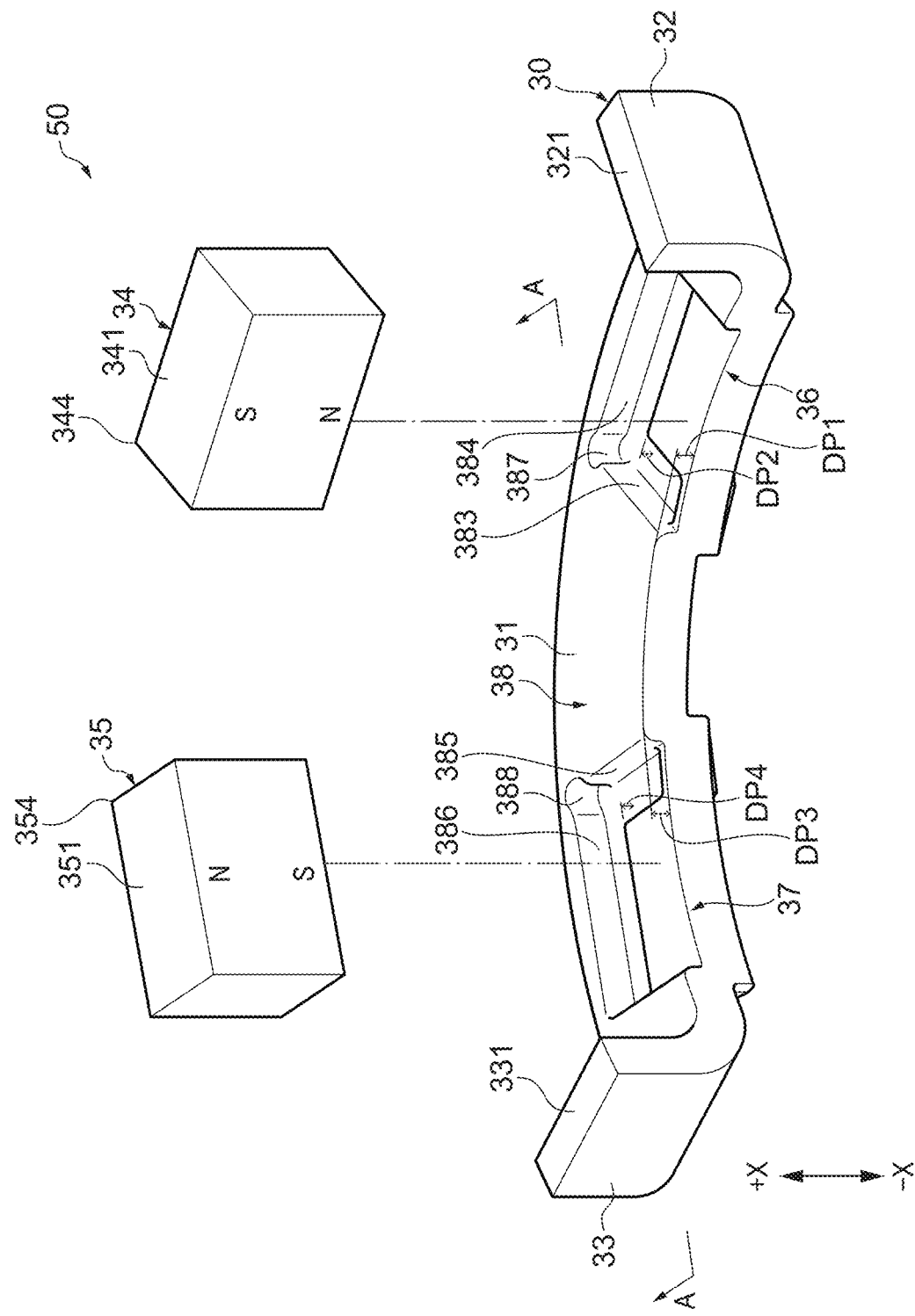
FIG. 4 is an exploded perspective view of a main part of the magnetic sensor unit.
Figure 6:
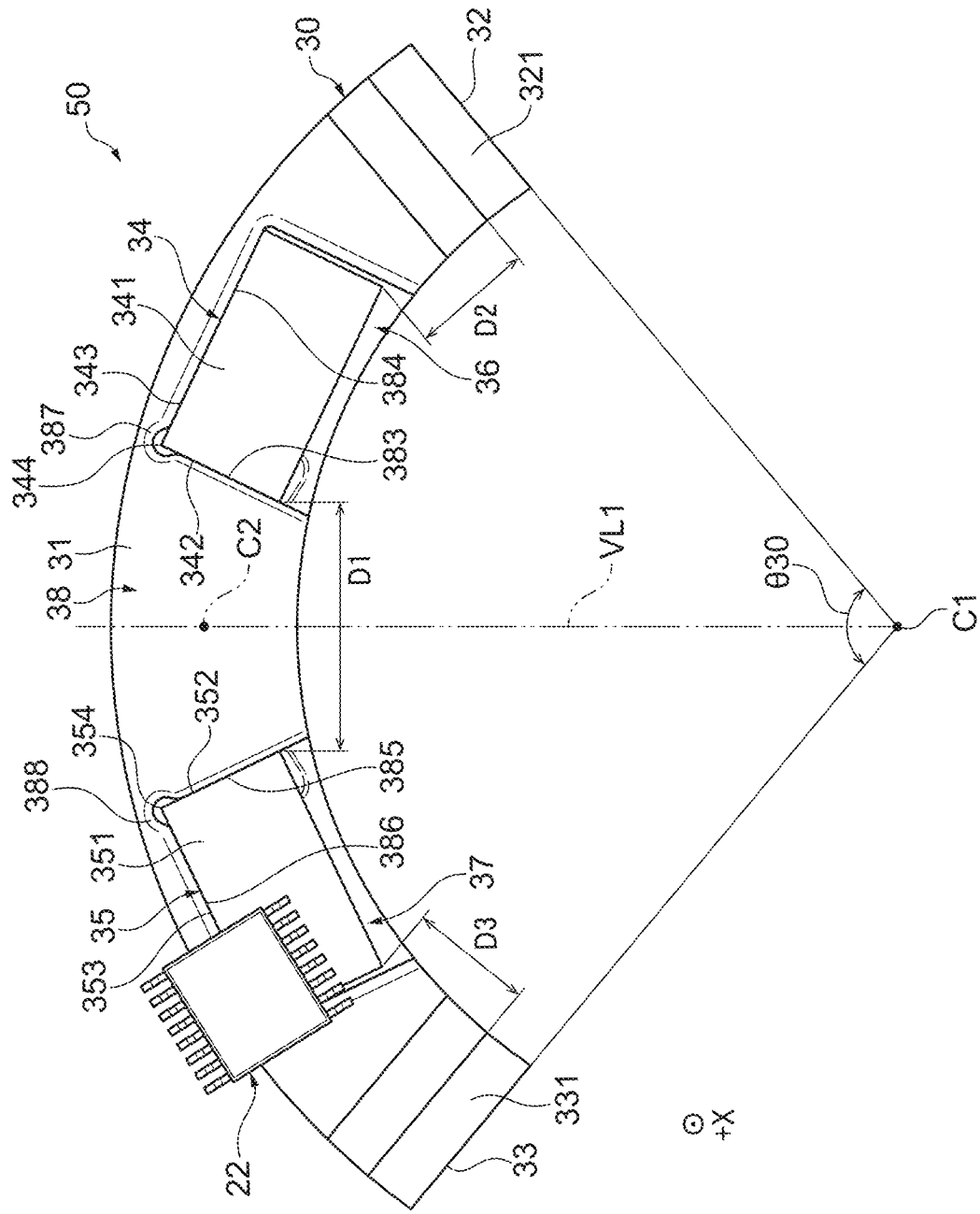
FIG. 6 is a view as viewed from a direction of an arrow B in FIG. 3.
Figure 7:
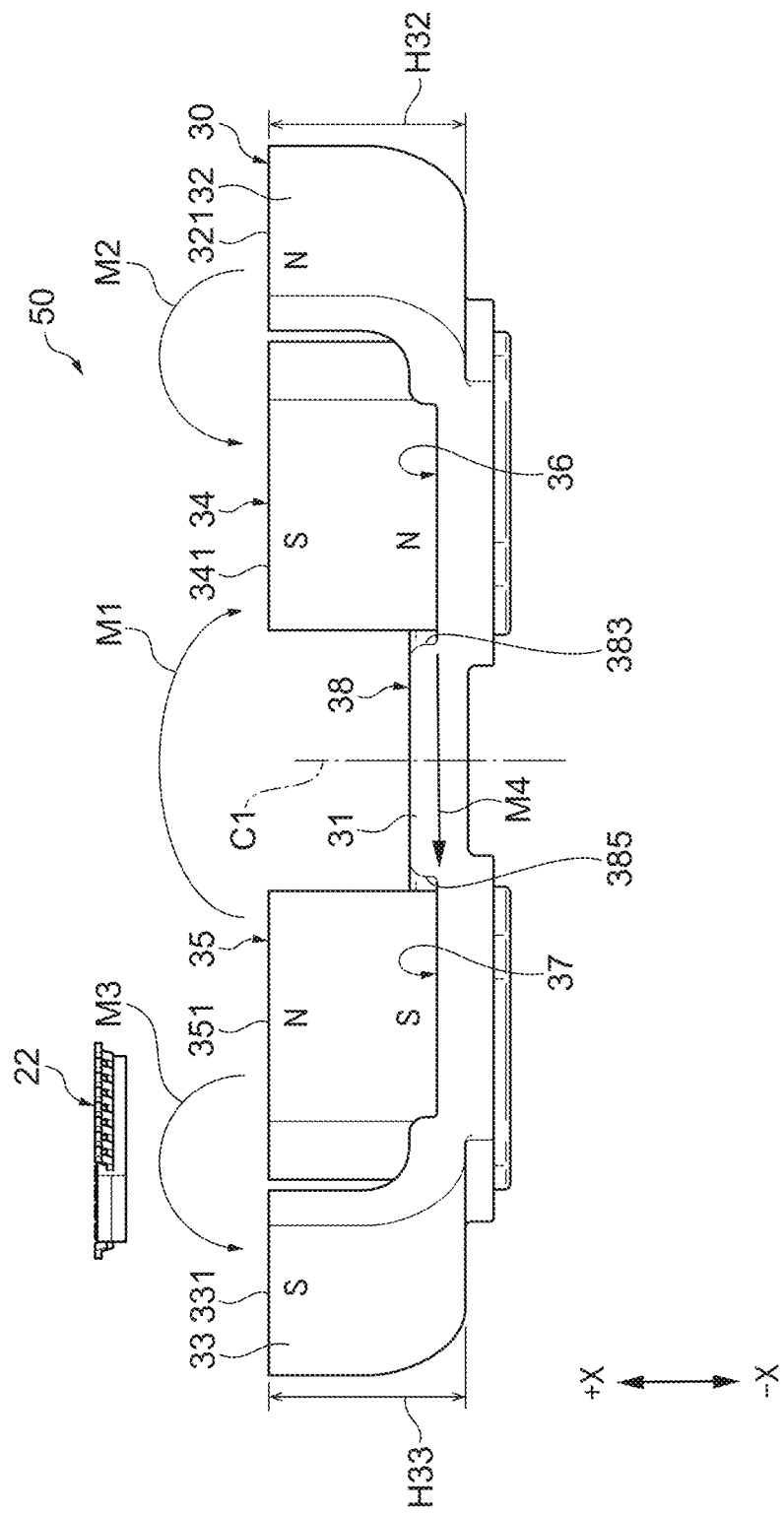
FIG. 7 is a view as viewed from a direction of an arrow C in FIG. 3.

As shown in FIGS. 3 and 4, the yoke 30 is formed of a plate-shaped member. As a constituent material of the yoke 30, for example, a soft magnetic material such as iron, silicon steel, or permalloy is used. As a result, the yoke 30 is easily magnetized by the magnetic fields from the magnet 34 and the magnet 35. The yoke 30 includes a flat portion 31 extending in a displacement direction of the rotor 13, that is, in a rotation direction, a bent portion 32 bent from one end portion of the flat portion 31 in the displacement direction, and a bent portion 33 bent from the other end portion. As shown in FIGS. 6 and 7, the flat portion 31 has an arc shape centered on the rotation center C1, and is substantially perpendicular to rotation center C1. As a result, the yoke 30 can stably rotate together with the magnet 34 and the magnet 35, accompanying the rotation of the rotor 13. For example, when two magnets are used, a center angle θ30 of the arc-shaped flat portion 31 is preferably 90° or more and 180° or less (90°≤θ30≤180°), and more preferably 90° or more and 120° or less (90°≤θ30≤120°). The bent portion 32 and the bent portion 33 protrude (stand) in a direction intersecting the flat portion 31, that is, in the +X side. A protrusion height H32 of the bent portion 32 and a protrusion height H33 of the bent portion 33 are the same.

On the +X side of the flat portion 31, the magnet 34 and the magnet 35 are fixed between the bent portion 32 and the bent portion 33. On the flat portion 31, the magnet 34 is positioned on the side of the bent portion 32, and the magnet 35 is positioned on the side of the bent portion 33. Each of the magnet 34 and the magnet 35 is a rectangular parallelepiped permanent magnet, and is fixed to the flat portion 31 by magnetic force. It should be noted that the method for fixing magnet 34 and magnet 35 to the flat portion 31 is not limited to the magnetic force fixing method. For example, molding in which the magnet 34 and the magnet 35, and the yoke 30 are covered with resin, may be used in combination with the magnetic force fixing method. The magnet 34 and the magnet 35 are disposed apart from each other in the longitudinal direction of the flat portion 31 (in relative displacement direction of the rotor 13). In addition, in one of the magnet 34 and the magnet 35, the N pole faces the side of the yoke 30, and in the other magnet, the S pole faces the side of the yoke 30. In the present embodiment, the N pole of the magnet 34 faces the side of the flat portion 31 of the yoke 30, and the S pole of the magnet 35 faces the side of the flat portion 31 of the yoke 30. As described above, the magnet 34 and the magnet 35 adjacent to each other are disposed in a manner that the magnetic poles abutting on the flat portion 31 are opposite.

As shown in FIG. 6, the magnet 34 and the magnet 35 are disposed with a gap D1 in the shortest distance (a linear distance), being maintained. The magnet 34 is disposed with a gap D2 in the shortest distance with respect to bent portion 32 being maintained. The magnet 35 is disposed with a gap D3 in the shortest distance with respect to bent portion 33. The gap D1, the gap D2, and the gap D3 may be the same as or may be different from one another. As shown in FIG. 7, a surface 341 on the +X side of the magnet 34, a surface 351 on the +X side of the magnet 35, a surface 321 on the +X side of the bent portion 32, and a surface 331 on the +X side of the bent portion 33 are positioned on the same plane.

As described above, the magnetic sensor 22 is fixed to the base plate 21. As shown in FIG. 3 (also in FIGS. 6 and 7), the magnetic sensor 22 is disposed so as to face the flat portion 31. It should be noted that, in FIG. 3 (also in FIGS. 6 and 7), illustration of the base plate 21 is omitted. The magnetic sensor 22 detects a change of a magnetic field formed by the magnet 34 and the magnet 35. The rotation operation of the grip portion 10 by the driver is a throttle operation. By this throttle operation, as described above, the yoke 30, and the magnet 34 and the magnet 35 rotate together with the rotor 13. The magnetic sensor 22 detects rotational displacement of the rotor 13 in accordance with a change of the magnetic field, and detects the rotational displacement as a throttle opening. Then, the intake air amount of the engine is adjusted in accordance with the throttle opening, and the output of the engine and the engine speed are controlled.

Next, the relationship between the magnetic force lines of the magnets 34 and 35 and the detection of the change of the magnetic field by the magnetic sensor 22 will be described. FIG. 7 schematically shows magnetic flux vectors formed by the magnets 34 and 35 and the yoke 30.

As shown in FIG. 7, a magnetic force line M1 is formed from the surface 351 (N pole) of the magnet 35 to the surface 341 (S pole) of the magnet 34. In addition, the N pole of the magnet 34 abuts on the flat portion 31. As a result, the polarity on the side of the surface 321 of the bent portion 32 close to the magnet 34 becomes the N pole, and a magnetic force line M2 is formed from the surface 321 (N pole) to the surface 341 (S pole) of the magnet 34. On the other hand, the S pole of the magnet 35 abuts on the flat portion 31. As a result, the polarity of the surface 331 of the bent portion 33 close to the magnet 35 becomes the S pole, and a magnetic force line M3 is formed from the surface 351 (N pole) of the magnet 35 to the surface 331 (S pole) of the bent portion 33.

The yoke 30, and the magnet 34 and the magnet 35 are rotationally displaced about the rotation center C1 relatively to the magnetic sensor 22 by the throttle operation. At this time, the magnitude of the magnetic field passing through the magnetic sensor 22 and the direction of the magnetic force line change.

Here, a case where the bent portion 32 and the bent portion 33 are omitted from the yoke 30 will be considered. In this case, the magnetic force lines equivalent to the magnetic force line M2 and the magnetic force line M3 are hardly formed, and only the magnetic force line M1 is mainly formed. Therefore, the detection range of the rotational displacement of the rotor 13 is limited to the range in which the space between the magnet 34 and the magnet 35 face the magnetic sensor 22.

On the other hand, in the present embodiment, not only the magnetic force line M1 but also the magnetic force line M2 and the magnetic force line M3 are formed. Therefore, the detection range of the rotational displacement of the rotor 13 can be expanded to a range in which the space between the bent portion 32 and the bent portion 33 face the magnetic sensor 22.

In addition, the yoke 30 is a magnetic body, and hence serves a shielding function. As a result, it is possible to suppress the influence of the external magnetic field on the magnetic sensor 22 from the −X side, which enhances the detection accuracy of the rotational displacement of the rotor 13. In addition, the yoke 30 can concentrate the magnetic force lines on the side of the magnetic sensor 22, and the magnet 34 and the magnet 35 can be downsized. As described above, the magnet 34 and the magnet 35 are disposed apart from each other by the gap D1. The magnet 34 is disposed apart from the bent portion 32 by the gap D2. The magnet 35 is disposed apart from the bent portion 33 by the gap D3. With such a disposition, the range in which the magnetic field in the longitudinal direction of the yoke 30 exists becomes large, and thus, it is easy to widen the detection range. In addition, since the magnet 34 and the magnet 35 have opposite magnetic poles that abut on the flat portion 31, the detection range can be widened.

As described above, the magnet 34 and the magnet 35 are disposed apart from each other. Therefore, a space is formed between the magnet 34 and the magnet 35. In this space, the magnetic flux density is likely to decrease in accordance with the size of the space between the magnet 34 and the magnet 35, and there is a possibility that the magnetic flux density is likely to be affected by the external magnetic field. This case may make it difficult for the magnetic sensor 22 to accurately detect the change of the magnetic field accompanying the rotation of the rotor 13. In addition, when the magnet 34 and the magnet 35 are not accurately positioned with respect to the yoke 30, it may be difficult to detect the rotational displacement of the rotor 13.

Therefore, the magnetic sensor unit 50 is configured to be able to reduce such a defect. Hereinafter, this configuration and operation will be described.

As shown in FIG. 4, the flat portion 31 of the yoke 30 is provided with a concave portion (a first concave portion) 36 at a portion to which the magnet 34 is fixed and a concave portion (a second concave portion) 37 at a portion to which the magnet 35 is fixed. The concave portion 36 and the concave portion 37 relatively form a convex portion 38 between the magnet 34 and the magnet 35 and around the magnet 34 and the magnet 35 in the yoke 30. Therefore, the yoke 30 has convex portion 38 protruding between the magnet 34 and the magnet 35, that is, in the middle of the longitudinal direction of the flat portion 31. It should be noted that the concave portion 36 and the concave portion 37 are formed by press working, for example.

The convex portion 38 includes an abutting portion (a first abutting portion) 383 on which the magnet 34 abuts and an abutting portion (a second abutting portion) 385 on which the magnet 35 abuts. As shown in FIG. 6, the abutting portion 383 and the abutting portion 385 are disposed in line symmetry with an imaginary line VL1 passing through a middle point C2 of them and the rotation center C1 as an axis of symmetry.

The abutting portion 383 is in surface contact with a surface 342 of the magnet 34 on the side of the magnet 35. As a result, the abutting portion 383 can ensure a large contact area with the magnet 34. In addition, the abutting portion 385 is in surface contact with a surface 352 of the magnet 35 on the side of the magnet 34. As a result, the abutting portion 385 can ensure a large contact area with the magnet 35. Then, as shown in FIG. 7, a portion between the abutting portion 383 and the abutting portion 385 serves as a magnetic path, and forms a magnetic force line M4 from the N pole of the magnet 34 toward the S pole of the magnet 35 in a concentrated manner, which can further increase the magnetic flux density between the magnet 34 and the magnet 35. As a result, the influence from the external magnetic field is suppressed in the space between the magnet 34 and the magnet 35. Then, the magnetic sensor 22 can more accurately detect the change of the magnetic field accompanying the rotation of the rotor 13, between the magnet 34 and the magnet 35, that is, the detection accuracy of the change of the magnetic field by the magnetic sensor 22 is further improved.

In addition, a wall surface (an auxiliary abutting portion) 384 in surface contact with an outer surface 343 of the magnet 34 is formed to be connected to the abutting portion 383. A wall surface (an auxiliary abutting portion) 386 in surface contact with an outer surface 353 of the magnet 35 is formed to be connected to the abutting portion 385.

The abutting portion 383 enables accurate positioning of the magnet 34 with respect to the circumferential direction of the yoke 30, and the wall surface 384 enables accurate positioning of the magnet 34 with respect to the radial direction of the yoke 30. The abutting portion 385 enables accurate positioning of the magnet 35 with respect to the circumferential direction of the yoke 30, and the wall surface 386 enables accurate positioning of the magnet 35 with respect to the radial direction of the yoke 30. Furthermore, by providing the abutting portion 383 and the abutting portion 385 between the magnet 34 and the magnet 35, the magnet 34 and the magnet 35 can be accurately positioned with respect to each other, which makes it possible to detect the displacement more accurately.

It should be noted that a space between the abutting portion 383 and the wall surface 384 is recessed, and serves as an escape portion 387 that escapes from a corner portion 344 of the magnet 34 (see FIG. 6). Similarly, a space between the abutting portion 385 and the wall surface 386 is also recessed, and serves as an escape portion 388 that escapes from a corner portion 354 of the magnet 35.

Figure 8:
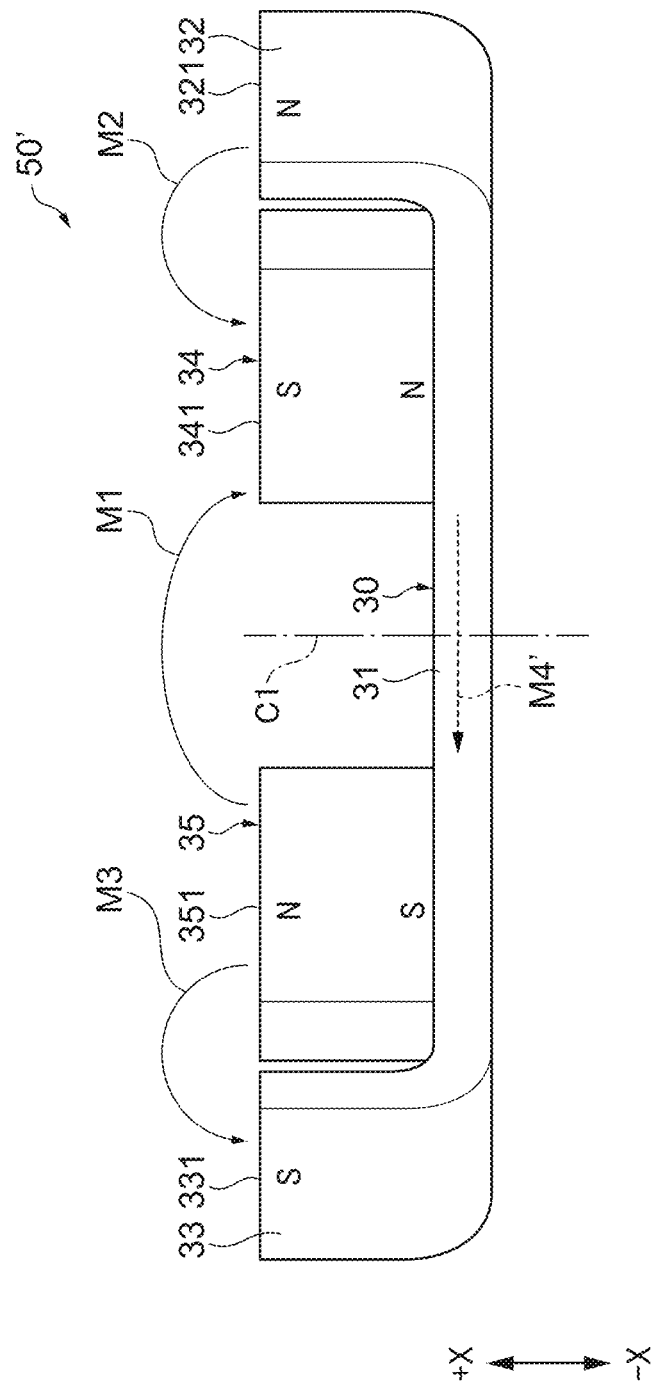
FIG. 8 is a side view of a conventional magnetic sensor unit.

Here, a magnetic sensor unit 50' in which the abutting portion 383 and the convex portion 38 having the abutting portion 385 are omitted from the yoke 30 will be considered. In this case, as shown in FIG. 8, since the convex portion 38 is omitted, it is difficult to sufficiently form a magnetic force line M4' from the N pole of the magnet 34 toward the S pole of the magnet 35, that is, the magnetic force line M4' becomes lower in magnetic flux density than the magnetic force line M4 in the magnetic sensor unit 50. Accordingly, a magnetic flux density M1 to a magnetic flux density M3 also lower. For example, although it depends on various conditions such as the constituent materials of the magnets 34, 35 and the yoke 30 and the size of the gap D1, in some cases the magnetic flux density in (a portion that generates the magnetic force line M4' in) the magnetic sensor unit 50' may become smaller by about 20% to 40% than the magnetic flux density in (a portion that generates the magnetic force line M4 in) the magnetic sensor unit 50. This may affect accurate detection of a change of the magnetic field by the magnetic sensor 22. In addition, in the magnetic sensor unit 50', since the convex portion 38 is omitted, the positions of the magnet 34 and the magnet 35 on the yoke 30 are not settled, and accurate positioning is difficult.

Figure 5:
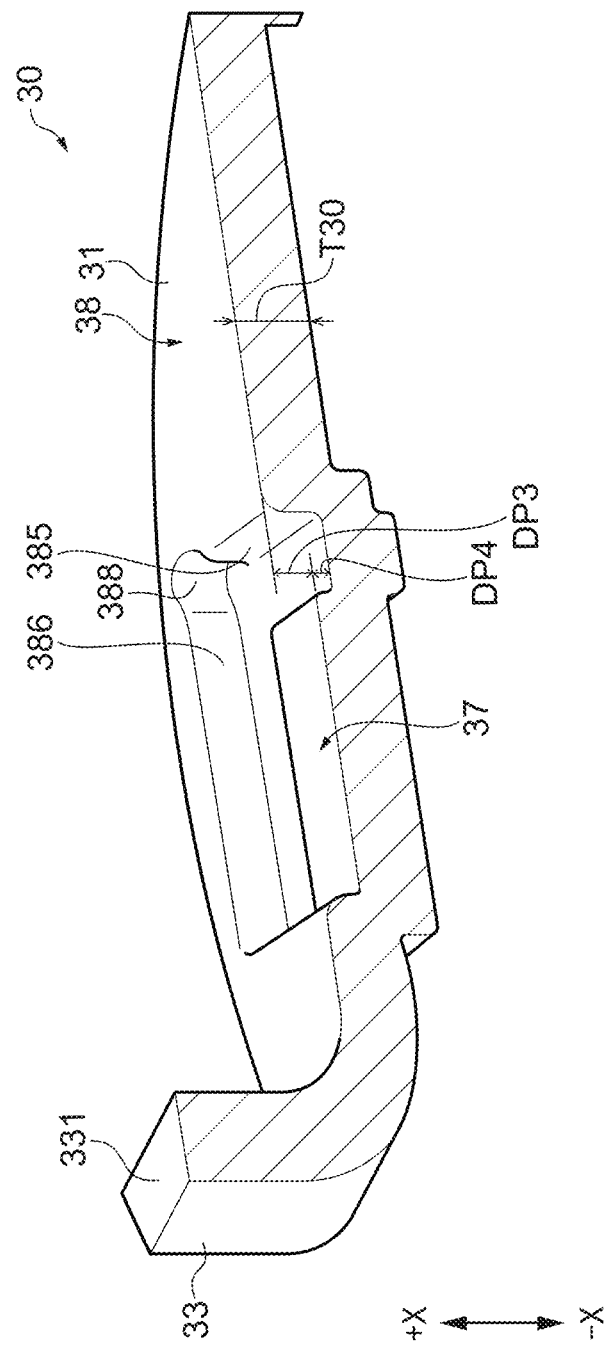
FIG. 5 is a cross-sectional view taken along a line A-A in FIG. 4.

As shown in FIG. 4, in the concave portion 36, the depth (DP1+DP2) on the side of the abutting portion 383 is deeper than the depth (DP2) of the other portion. As a result, it is possible to reliably secure the abutting portion 383 and the wall surface 384 with which the magnet 34 is in surface contact. Similarly, in the concave portion 37, the depth (DP3+DP4) on the side of the abutting portion 385 is deeper than the depth (DP4) of the other portion (see FIG. 5). As a result, it is possible to reliably secure the abutting portion 385 and the wall surface 386 with which the magnet 35 is in surface contact.

In addition, the depth DP3 of the concave portion 37, that is, the length in a plate thickness direction of the yoke 30 of the abutting portion 385 is preferably 25% or more and 100% or less, and more preferably 25% or more and 50% or less of a plate thickness T30 of the yoke 30. The same applies to the depth DP1 of the concave portion 36, that is, the length in the plate thickness direction of the abutting portion 383. As a result, the contact range between the abutting portion 383 and the magnet 34 and the contact range between the abutting portion 385 and the magnet 35 can be sufficiently secured, and the magnetic flux density in the convex portion 38 can be further increased.

It should be noted that the displacement member (displacement detection target) whose displacement is detected by the magnetic sensor 22 is the rotor 13 in the present embodiment; however, the present invention is not limited to this, and the displacement member may be any member as long as the displacement member is relatively displaced with respect to the magnetic sensor 22. Therefore, either or both of the magnetic sensor 22 and the displacement member may be configured to be actually displaced. In addition, the manner of displacement of the relative displacement member is not limited to the rotational displacement.

This application claims the benefit of Japanese Patent Application No. 2021-173786 filed on Oct. 25, 2021, which is hereby incorporated by reference wherein in its entirety.

What is claimed is:

1. A magnetic sensor unit comprising:
    a magnetic body fixed to a second member that is relatively displaced with respect to a first member;
    at least two magnets fixed to the magnetic body and disposed apart from each other in a relative displacement direction of the second member; and
    a magnetic sensor that is fixed to the first member and is configured to detect a change of a magnetic field formed by the at least two magnets, wherein
    the magnetic body has a convex portion protruding between the two magnets,
    the convex portion has abutting portions on which the two magnets abut,
    the magnetic body is provided with concave portions each at a portion to which each magnet is fixed,
    by provision of the concave portions, the convex portion is relatively formed between the two magnets on the magnetic body, and
    each of the concave portions has a depth on a side of the abutting portion deeper than a depth of the other portion thereof.

2. The magnetic sensor unit according to claim 1, wherein the magnetic body has a plate shape, and
    a length of each of the abutting portions, along a plate thickness direction of the magnetic body, is 25% or more and 100% or less of a plate thickness of the magnetic body.

3. The magnetic sensor unit according to claim 2, wherein the magnetic body has a plate shape, and
    a length of each of the abutting portions, along the plate thickness direction of the magnetic body, is 25% or more and 50% or less of the plate thickness of the magnetic body.

4. The magnetic sensor unit according to claim 1, wherein each of the abutting portions is in surface contact with the magnet.

5. The magnetic sensor unit according to claim 1, wherein the magnetic body includes
    a flat portion that extends in the displacement direction and has the convex portion disposed in a middle of the displacement direction, and
    two bent portions that are formed by both end portions of the flat portion in the displacement direction being bent in a direction intersecting the flat portion.

6. The magnetic sensor unit according to claim 5, wherein an N pole of one of the two magnets faces a side of the magnetic body side, and an S pole of the other magnet faces the side of the magnetic body.

7. The magnetic sensor unit according to claim 6, wherein the magnetic sensor is disposed so as to face the flat portion.

8. The magnetic sensor unit according to claim 7, wherein the second member is rotationally displaced about a rotation center, and
    the flat portion is substantially perpendicular to the rotation center.

9. The magnetic sensor unit according to claim 1, wherein the magnetic sensor unit is a component of a throttle grip device to be attached to a handle of a two-wheeled vehicle,
    the second member is rotated by throttle operation of a grip portion of the handle, and
    the magnetic sensor detects rotational displacement of the second member as a throttle opening in accordance with a change of the magnetic field.

* * * * *